Patented Jan. 18, 1949

2,459,203

UNITED STATES PATENT OFFICE 2,459,203

PRODUCTION OF SHAPED ARTICLES FROM FLUORITE

George J. Vahrenkamp, Rolla, Mo., assignor to the United States of America as represented by the Secretary of the Interior No Drawing. Application February 21, 1944, Serial No. 523,249

4 Claims. (Cl. 75—3)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the production of shaped articles, such as balls, pellets, tablets, cubes, bricks, extruded forms and the like from fluorite, and more particularly to the production of such articles from finely-divided forms of fluorite such as flotation concentrates and the like.

Recently, flotation procedures yielding a highly-pure fluorite have been developed, but such fluorite is in finely-divided form unsuitable for many uses. It has now been found that finely-divided fluorite can be bonded together in a simple fashion to form articles of any desired shape.

An object of this invention is the production of shaped articles such as balls, pellets, tablets, cubes, bricks, extruded forms and the like, from finely-divided fluorite, such as flotation concentrates. Another object is to provide a novel fluorite bonding agent.

The foregoing and other related objects hereinafter apparent are accomplished in accordance with this invention wherein finely-divided fluorite is admixed with a minor amount of bentonite, formed into a desired shape, and then calcined at an elevated temperature.

Preferably, sufficient water is employed in mixing the finely-divided fluorite with the bentonite to facilitate formation of the mixture into shaped articles, and in general about 10 percent to 20 percent by weight of water based on dry fluorite has been found suitable. The bonding agent employed is bentonite, a form of montmorillonite, and it is preferably pre-gelled with water prior to mixing with fluorite. Generally, not more than 5 percent of bentonite by weight based on fluorite, is employed as a binding agent and preferably a more restricted amount of bentonite between 0.2 percent and 1.0 percent by weight is employed. It is desirable to incorporate at least 0.1 percent by weight of bentonite since a smaller amount may sacrifice some of the advantages of the invention.

In operation, finely-divided fluorite is thoroughly mixed with the required quantity of bentonite and sufficient water to make a stiff mud or paste. Thereafter, the plastic mixture is formed into the desired shaped article as by extrusion, pelleting, tableting or molding, and the resulting article is calcined in a suitable kiln at a temperature of from about 700 degrees C. to 1350 degrees C. Preferably the calcining temperature is maintained between a more restricted range of 800 degrees C. to 1200 degrees C. The shaped articles are then cooled and are found to possess great strength and resistance to abrasion.

Occassionally, fluorite concentrates from flotation processes are found to contain a substantial proportion of carbonates such as limestone and the like which tend to lower the high strength of the shaped articles herein produced. Therefore, it is desirable to acidify carbonate-containing fluorite concentrates with sulfuric acid to increase the calcium ion concentration of the slurry which in turn has a modifying effect on the bentonite through an exchange of the bases before forming the shapes. The following examples illustrate how the invention may be carried out but it is not restricted thereto. Parts and percentage compositions given are by weight unless otherwise designated:

EXAMPLE 1

Bentonite in the proportion given in the table below was mixed with the required amount of water, the resulting gel was then incorporated in a mixing device with the required amount of minus 65-mesh fluorite containing 98.07 percent calcium fluoride, 1.75 percent calcium carbonate and 0.24 percent silica. The resulting thick paste was molded into spherical pellets averaging one-half to three-quarters of an inch in diameter, the pellets were dried at room temperature and then calcined for one hour at a temperature of 1000 degrees centigrade.

The abrasion resistant qualities of the pellets were tested by rotating them in a pebble mill from which the pebbles had been removed, for successive 5-minute intervals. At the end of each 5-minute grinding period the resulting dust formed was removed and weighed. The average weight loss, a measure of abrasion resistance, is tabulated in the table.

Table

| Screen Size of Fluorite Mesh | Per Cent Bentonite | Per Cent Moisture on Dry Ore Basis | Calcination Temperature, Degrees Centigrade | Calcination Time, Hours | Abrasion Resistance Average Per Cent Loss of Weight per 5-minute Interval | Apparent Density |
|---|---|---|---|---|---|---|
| Minus 65 | 1.0 | 20.0 | 1,000 | 1 | 4.81 | 2.54 |
| Do | .5 | 20.0 | 1,000 | 1 | 5.04 | 2.54 |

The pellets resulting from the above procedure were found to be very hard, strong and resistant to abrasion.

Example 2

Example 1 was repeated employing 0.25 percent bentonite as a binder while the formed pellets were calcined at a low temperature of about 650 degrees centigrade. When the grinding test of Example 1 was repeated the pellets averaged a weight loss of 33.3 percent for each 5-minute grinding interval, showing that the low calcination temperature resulted in pellets of reduced abrasion resistance.

Example 3

Bentonite in the proportion of 0.5 percent based on fluorite weight was mixed with just sufficient water to form a fluid product. The resulting gel was then added to a fluorite flotation concentrate containing approximately 80.0 percent water, mixed thoroughly and the mixture was filtered. The resulting filter cake containing 87 percent fluorite concentrate, 0.44 percent bentonite and 12.56 percent water was discharged into a counter-current-fired rotary kiln in which the fluorite concentrate was agglomerated, dried and calcined successively as it progressed through the kiln. Temperatures ranged from 400 degrees centigrade at the cold end of the rotary kiln where the fluorite filter cake was introduced, to 850 degrees centigrade at the hot end where the calcined glomerules varying from one-fourth to one inch in size were discharged. The time of passage of the material through the rotary kiln was approximately one hour.

Example 4

Sulfuric acid in the proportion of 0.5 percent based on fluorite weight was added to a fluorite flotation concentrate containing approximately 80.0 percent water and mixed thoroughly. The fluorite flotation concentrate contained 4.5 percent calcium carbonate on a dry basis. After the reaction of sulfuric acid with the flotation concentrate was completed, bentonite in the proportion of 1.0 percent based on fluorite weight was added to the above components. The resulting mixture was stirred thoroughly, filtered, formed into pellets, dried and calcined at a temperature of 850 degrees centigrade for one hour, to yield a pelleted fluorite very suitable for metallurgical use.

The articles made in accordance with the above preferred examples could be dropped from a height 8 feet to a concrete floor without breaking, thus showing their high strength and resistance to shattering. Although the pellets were calcined at elevated temperatures, no substantial loss in fluorine content occurred. The products produced in accordance with this invention were tested by immersion in water for 66 hours without disintegration, at which time the test was discontinued.

Although in the foregoing examples a calcination time of one hour was employed, it is not intended to limit the invention to any particular period of calcination, since longer or shorter calcination periods can be employed with entire success. In the examples, fluorite of minus 65-mesh was employed, but larger or smaller sizes can as well be employed ranging to minus 300-mesh or finer. About 12 to 20 percent by weight of water was found satisfactory in the examples, greater or lesser quantities can be employed depending upon the type of equipment used.

It will be apparent from the foregoing description and examples that a very desirable method has been provided for forming extremely hard, strong and abrasion-resistant shaped articles of fluorite from flotation concentrates and other finely-divided forms of fluorite. While the metallurgical industry previously required fluorite of the type known as "hand picked" or jig and table concentrate in order to secure satisfactory operating characteristics in metallurgical equipment, this invention provides fluorite of any desired size or shape for use in the arts, being especially suitable for metallurgical purposes.

Since many widely differing embodiments of the invention will occur to one skilled in the art, it is apparent that various changes can be made in the invention without departing from the spirit and scope thereof.

What is claimed is:

1. A process for pelleting finely-divided fluorite which comprises admixing together about 0.25 part by weight of bentonite and about 20 parts by weight of water then incorporating therewith about 80 parts by weight of finely-divided fluorite, forming the resulting mixture into pellets, and calcining said pellets at a temperature of about 1000 degrees centigrade.

2. As a new article of manufacture, of great strength and resistance to abrasion, a shaped calcined object consisting essentially of discrete fluorite particles bonded together by bentonite in the proportion of 0.2 to 1.0 percent by weight based on the weight of fluorite.

3. A process for producing a shaped article from finely-divided fluorite flotation concentrates which consists in incorporating with such fluorite between 0.2 and 1.0 percent by weight of bentonite and sufficient water to form a plastic mix, then forming the resulting mixture into the desired shape and calcining the shaped mixture at an elevated temperature of between 700° C. and 1350° C.

4. A process in accordance with claim 3 wherein the fluorite flotation concentrate contains a substantial amount of calcium carbonate, and the mixture is treated with sufficient sulphuric acid to neutralize the calcium content thereof.

GEORGE J. VAHRENKAMP.

REFERENCES CITED

The following references are of record in the file of this patent:

UNITED STATES PATENTS

| Number | Name | Date |
| --- | --- | --- |
| 572,969 | Dangler | Dec. 15, 1896 |
| 1,910,444 | Nicholson | May 23, 1933 |
| 2,184,078 | Hyde | Dec. 19, 1939 |
| 2,215,078 | Cavadino | Sept. 17, 1940 |
| 2,220,383 | Abbott et al. | Nov. 5, 1940 |
| 2,220,385 | Abbott et al. | Nov. 5, 1940 |
| 2,279,033 | Dolbear | Apr. 7, 1942 |